United States Patent [19]
Hopkins

[11] 3,935,591
[45] Jan. 27, 1976

[54] AUDIO-VISUAL APPARATUS WITH CONTROL SIGNAL OPERATED GATING MEANS

[75] Inventor: Gorden Lambert Hopkins, Lake Park, Fla.

[73] Assignee: RCA Corporation, New York, N.Y.

[22] Filed: Jan. 10, 1974

[21] Appl. No.: 432,136

[52] U.S. Cl. .................... 360/19; 360/23; 360/61; 178/5.6
[51] Int. Cl.² ......................................... H04N 7/00
[58] Field of Search ............. 360/19, 20, 9, 61, 23, 360/27, 32; 179/2 TV; 178/5.6, 5.8, DIG. 23, DIG. 35

[56] References Cited
UNITED STATES PATENTS

| | | | |
|---|---|---|---|
| 3,021,384 | 2/1962 | Brown | 179/2 TV |
| 3,085,130 | 4/1963 | Lemelson | 360/79 |
| 3,423,520 | 1/1969 | Kelly | 178/5.6 |
| 3,663,749 | 5/1972 | Cannon | 178/DIG. 23 |
| 3,746,793 | 7/1973 | Sachs | 179/2 TV |
| 3,789,137 | 1/1974 | Newell | 178/5.6 |
| 3,798,610 | 3/1974 | Bliss | 178/DIG. 23 |

*Primary Examiner*—Bernard Konick
*Assistant Examiner*—Alan Faber
*Attorney, Agent, or Firm*—Edward J. Norton; George J. Seligsohn

[57] ABSTRACT

Adaptor for reliably switching between audio and video information signals obtained from an external audio input device (e.g., the tape of a standard audio cassette recorder or player) with only the video information signals being applied to standard television receiver.

6 Claims, 10 Drawing Figures

CASSETTE RECORDING MEANS FOR SIMULTANEOUS
TRANSMISSION OF BINARY AND AUDIO

SIMULTANEOUS BINARY AND AUDIO
TRANSMISSION COUPLING MEANS

LIMITED BANDWITH
TV DISPLAY

CORRECTION FONT FOR LIMITED
BANDWIDTH TV DISPLAY

VIDEO-SIGNAL CORRECTION FOR
LIMITED BANDWIDTH T.V. DISPLAY

AUDIO-VISUAL APPARATUS WITH CONTROL SIGNAL OPERATED GATING MEANS

This application is related to the application of Willian James Hannan, Ser. No. 432,175 filed on even date herewith.

This invention relates to audio-visual apparatus and, more particularly, to such apparatus which may employ any standard audio cassette tape recorder or player, standard record player or telephone line to provide the input thereto and any standard television receiver to display the output therefrom.

It has been recognized in the past that for many functions, such as teaching, advertising or entertaining, inter-related slow scanning video information and audio information recorded on a magnetic tape may be played back employing a cathode ray tube for the display of the video information (see U.S. Pat. No. 3,085,130). The relative cost of such equipment and the space-volume occupied thereby is considerably smaller than that required by conventional sound motion picture or conventional video magnetic tape playback equipment.

When the tape input equipment and the display output equipment are incorporated in and form integral parts of the audio-visual apparatus, as they do in the aforesaid U.S. Pat. No. 3,085,130, all the parts of the apparatus may be designed to be compatible with each other and to optimize the performance of the overall apparatus. However, the incorporation of the tape input means and the display output means as integral parts of the apparatus markedly contributes to the cost of the overall apparatus.

Since standard tape audio cassette players (with or without recording capability) and standard television receivers are already possessed by a very large number of people, it would greatly reduce the cost of audio-visual apparatus if the apparatus did not incorporate the tape input means or the output display means as parts thereof, but, instead, employed an already-possessed standard audio cassette tape player or other external audio input device such as a record player or telephone line as the input means and an already-possessed standard television receiver as the display output means. However, in this case, there is no control at all over the input provided by the already-possessed standard audio cassette tape recorder (or other external audio input device) or the display provided by the already possessed standard television receiver.

The present invention is directed to techniques for providing low-cost apparatus employing a long preamble code for reliably switching between time-division-multiplexed analog audio and frequency-shift-keyed video information signals obtained from a prerecorded tape (or other recording medium) of any standard audio cassette tape recorder or other external audio input device with any standard television receiver to provide a relatively high quality visual display of visual information together with correlated audio information, thereby enhancing the utility of an already-possessed cassette tape player and television receiver.

This and other features and advantages of the present invention will become more apparent from the following detailed description taken together with the accompanying drawing, in which.

Figure 1:
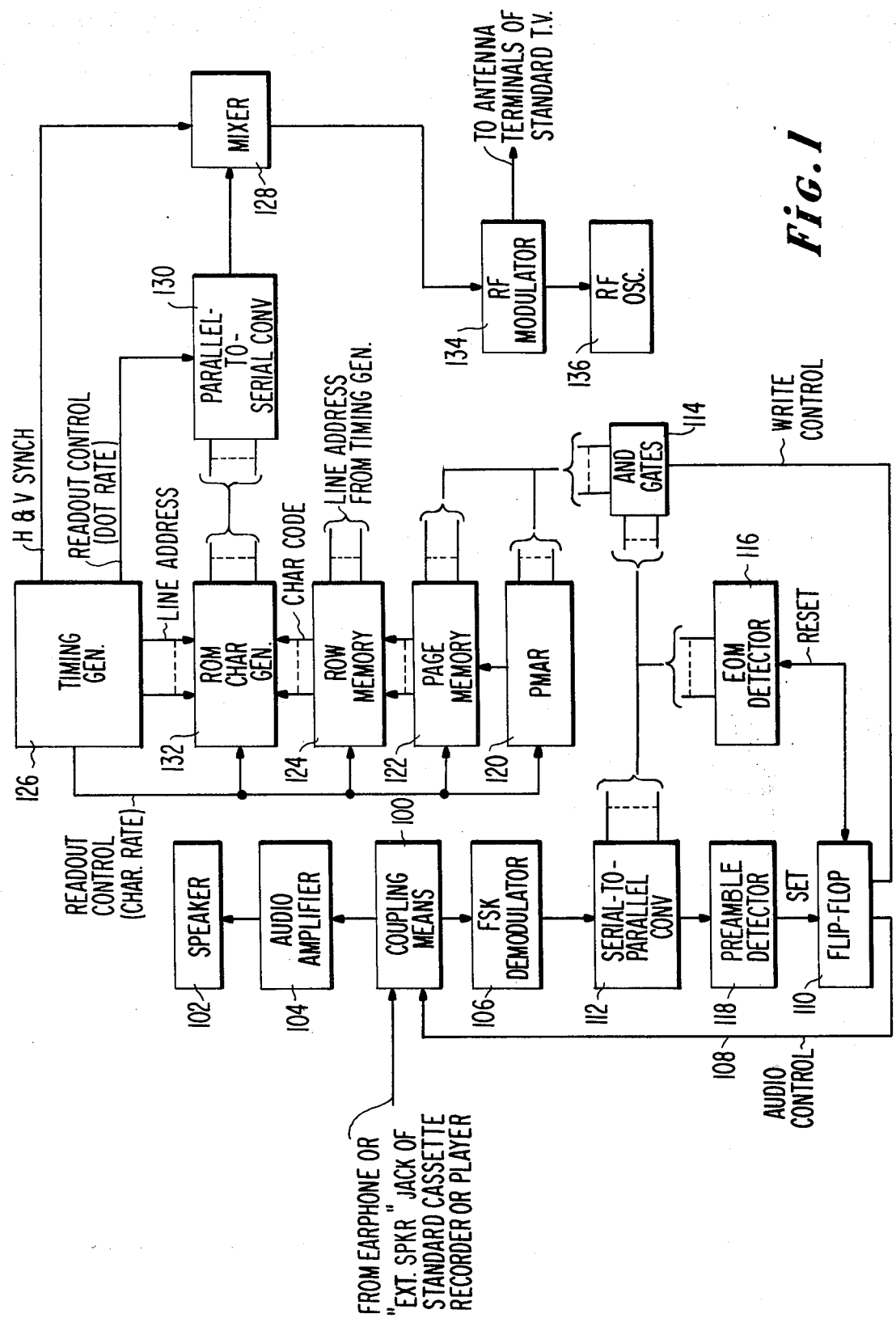
FIG. 1 is a block diagram of a basic embodiment of an adaptor for inter-relating a standard cassette recorder, which provides time division multiplexed analog audio-information signals and frequency-shift keyed video-information signals, with a standard television receiver.

In discussing FIG. 1, it will be assumed that audio-information signals are recorded on the audio cassette magnetic tape as audio analog signals of voice, music and/or other similar type signals that are to be ultimately heard by a listener. Video-information signals, to be displayed on the screen of a standard television receiver, are recorded during pauses in the audio-information signals as a sequence of binary bits of frequency shift keyed audio tones. This results in the audio information and the video information being time division multiplexed on the recorded cassette magnetic tape.

Standard cassette tape recorders and players include a jack normally designated either "EARPHONE," "EXTERNAL," or "EXT SPKR" which enables the signal from a tape being played back to be applied to an external device if a coupling plug from the external device is inserted in this jack. Conventionally, the insertion of this coupling plug has the effect of shorting out the internal speaker of the cassette tape recorder or player. The adapter of FIG. 1 receives its input from such a coupling plug inserted in this particular jack of a standard cassette tape recorder or player, as indicated at the left of FIG. 1.

Coupling means 100 is capable of applying this input to either speaker 102, preferably through audio amplifier 104, or to frequency-shift key (FSK) demodulator 106. Although not specifically shown in FIG. 1, the signal from coupling means 100 to audio amplifier 104 may also be connected to an "earphone" jack of the adaptor.

The purpose of speaker 102 and audio amplifier 104 is to broadcast the audio information and the purpose of FSK demodulator 106 is to detect the video information. Although coupling means 100 may be merely a wired connection for connecting the input thereto in parallel to both audio amplifier 104 and FSK demodulator 106, this is undesirable because all the FSK audio tones, manifesting the video information, will be heard over speaker 102 as a series of clicks. To limit this video-information crosstalk in speaker 102, coupling means 100 preferably includes a normally-open gate which is closed by an audio control signal on connection 108 whenever flip-flop 110 is switched to its set state, in a manner to be described below.

The playback tape speed provided by most standard tape recorders and players is not precise, so that the tape velocity may vary quite a bit. However, the use of frequency shift keying permits the bit rate to be determined independently of the tape velocity. This is done by making the bit period equal to some first known multiple of a first audio tone manifesting a binary ONE and equal to some second known multiple of a second audio tone manifesting a binary ZERO.

FSK demodulator 106 continuously monitors the input signal applied to coupling means 100 and, in response to the occurrence of FSK signals, demodulates these signals and detects the bit rate. By way of example, FSK demodulator 106 may include a TTL level shift circuit for changing each sinusoidal cycle of each of the two binary tones into a square wave having a wavelength equal to that of the tone period. An edge detector then produces respective spikes, all of the same polarity, in response to both positive going and negative going edges of the square wave. Each of the spikes triggers a monostable multivibrator to thereby produce a serial pulse signal. This serial pulse signal includes one or more first portions derived from the relatively lower-frequency audio tone, each of which has a relatively low duty cycle, and one or more second portions derived from the relatively higher-frequency audio tone, each of which has a relatively high duty cycle. The serial pulse signal is passed through a low pass filter which derives an output signal having a relatively low level during each relatively low duty cycle portion of the input signal thereto and a relatively high level output signal in response to each relatively high duty cycle portion of the input signal thereto. The output signal from the low pass filter is then digitalized by such means as a comparator or a Schmitt trigger to provide respective first and second binary value serial signals synchronous with the occurrence of each of the first and second serial audio tones employed for frequency shift keying. In addition, a bit-rate-manifesting signal may be derived by either counting a first known number of trigger signals from the edge detector in the presence of a ONE manifesting binary signal or a second known number of trigger signals from the edge detector in the presence of a ZERO manifesting binary signal.

The first and second binary value serial signals are applied from FSK demodulator 106 as an input to serial-to-parallel converter 108. Serial-to-parallel converter 108 may be a shift register in which case the bit-rate-manifesting signal is used to provide shift pulses. With the exception of a preamble code, the binary bits derived from the audio tones on the cassette tape are organized into bytes each having a predetermined fixed number of bits. For the purpose of discussing FIG. 1, it will be assumed that each byte is composed of seven bits, and that serial-to-parallel converter 112 includes a shift register having seven stages. The seven bits composing each successive byte are applied in parallel from serial-to-parallel converter 112 as an input to normally disabled AND gates 114 and as an input to end-of-message (EOM) detector 116.

Because of the time-division-multiplexed recording of audio information and video information from the magnetic tape, using audio-frequency signals for both, it is important that means be provided for reliably distinguishing the occurrence of video-information signals from audio-information signals. In order to accomplish this, any sequence of video-bit information following transmission of audio information is preceded by a preamble code consisting of an extra large number of consecutive bits, all of the same binary value. By way of example, the preamble code may consist of 44 consecutive binary ONE bit periods, i.e., the frequency shift audio tone manifesting a binary ONE recorded on the cassette tape persists for a duration equal to 44 bit periods. To appreciate the significance of this relatively long preamble code, consider that a bit period typically has a given duration of somewhere between 3 and 4 milliseconds. While a long persistent vocal or musical sound may by chance generate a frequency shift audio tone having a persistance of seven or eight bit periods, the chance that such a vocal or musical sound would persist for a 44 bit period of between 132 and 176 milliseconds is negligible. Therefore, the use of this long preamble code prevents "false alarms" which might otherwise result if the preamble code had only the seven bit duration employed for all the other video-bit information. Therefore, it is the use of this long 44 bit code which ensures the high reliability in discriminating between audio information and video information and which is essential to the proper operation of the system.

Preamble detector 118 is a circuit for producing an output for setting flip-flop 110 only in response to the receipt of the long preamble code from serial-to-parallel converter 112. By way of example, preamble detector 118 may consist of a counter which has both its counting input and its reset input connected to one of the stages (preferably the first) of the shift register forming serial-to-parallel converter 112. Only if this stage is manifesting a binary ONE at the time of occurrence of a shift pulse is a unity count added to the count registered by preamble detector 118. If a binary ZERO is ever manifested by the stage of the shift register of serial-to-parallel converter 112 at the time of occurrence of a shift pulse, the count registered in the counter of preamble detector 118 is reset to zero. Therefore, the counter of preamble detector 118 only reaches the required count (44 in the assumed case) that results in a set input being applied to flip-flop 110 if, and only if, a sequence of 44 consecutive binary ONEs has occurred.

The setting of flip-flop 110 causes an enabling write control signal to be applied to AND gates 114, thereby opening AND gates 114, and removes the enabling audio control signal on connection 108 from the audio gate within coupling means 100, thereby closing these audio gates to disconnect audio amplifier 104 from the input to coupling means 100.

The preamble code is followed by each of successive seven bit bytes of video information which appear in order on the output connections of serial-to-parallel converter 112 and are now passed through AND gates 114 as well as monitored by EOM detector 116. The video information bytes are made up of two groups. The first group consists of those bytes which are used for control purposes and the second group consists of these bytes which are used to manifest a character code. The binary value of a predetermined ordinal one of the bits in each byte is preferably used for control purposes to distinguish the type of group to which that byte belongs. (In certain cases the bytes each consist of eight bits, rather than seven, and a second predetermined ordinal one of the bits of each byte is used for other control purposes, as is discussed in more detail below in connection with FIGS. 7 and 8.) In all cases, however, the remaining six ordinal bits of each byte are employed to define the particular function or the particular character code manifested by that particular byte. One of the function codes is the end of message code to which EOM detector 116 is responsive. All of the rest of the function codes pass through AND gate 114 to page memory address register (PMAR) 120, which is responsive only to bytes of the control function group. Bytes manifesting character codes also pass through AND gates 114 and are applied as an input to page memory 122, which is responsive only to bytes of the character code group.

Page memory 122 has the capacity to store all the characters that can be displayed in a single frame by the television set, with the page arranged in a predetermined format. By way of example, the format may consist of sixteen rows of thirty-two character spaces each, i.e., a total of 512 character spaces arranged in 16 rows and 32 columns. Each character code byte written into page memory 122 is preceded by a sequence of three bytes manifesting control functions read into PMAR 120. Thus each write control instruction consists of four bytes. The first-occurring byte indicates that this is the beginning of a write control sequence; the second-occurring byte identifies the row address in a displayed page which includes the character then being written into page memory 122; the third-occurring byte identifies this character's column address; and the fourth-occurring byte is the character code identifying the particular character itself.

By way of example, page memory 122 may consist of six recirculating shift registers, each having 512 stages. Page memory 122 also includes all necessary control gates. Row memory 124, which has its input coupled to the output of page memory 122, consists of six recirculating shift registers, each having 32 stages, together with all necessary control gates. PMAR 120, page memory 122 and row memory 124 receive readout control signals from timing generator 126. These readout control signals include shift signals for the recirculating shift registers of page memory 122 and row memory 124. PMAR 120 include a first static register for storing the row-manifesting byte of the applied write control signal and a second static register for storing the column-manifesting byte of the write control signal. In addition, PMAR 120 may include a dynamic cyclic binary counter for counting the shift pulses of the readout control. The value registered in this dynamic counter at any time manifests the row and column addresses of the particular character then being recirculated from the output to the input of both page memory 122 and row memory 124. Normally, the recirculation loop of page memory 122 is closed. However, PMAR 120 includes a comparator for comparing the count then registered in the dynamic counter with the row and column addresses stored in the first and second static registers. When coincidence occurs, indicating that the address of a character then being recirculated is the same as that of a new character to be written in at that address, the output from PMAR 120 to page memory 122 opens the recirculation loop, thereby erasing the old character, and permits the character code of the write control signal to be passed through AND gates 114 and applied as an input to page memory 122 and thereby written into page memory 122 at this row and column address.

As is known in the art of television raster-scan video terminal displays, timing generator 126 may consist of a crystal oscillator master clock, suitable dividers for providing dot rate, character rate, horizontal scan line rate and vertical frame rate, respectively. Timing generator 126 may also include any counters and other logic circuitry required for arranging a display frame (page) in accordance with a predetermined format. By way of example, each scan line may consist of 54 character spaces, with each character space having a width equal to seven consecutive dots. It is necessary that the horizontal scanning line rate and the vertical field rate provided by the timing generator 126 be compatible with those of a standard television receiver, so that the conventional horizontal hold and vertical hold controls of the standard television receiver can be employed to lock the picture. Although timing generator 126 may provide interlacing, it is assumed for simplicity's sake, in the example being given here, that no interlacing is provided. In this case, the frame rate, which is equal to the field rate, should be as close to 60 frames (field) as is reasonably possible. Ideally, for a single frame per field, each frame (field) should consist of either 262 or 263 horizontal scan lines, since these numbers are closest to the 262.5 scan lines per field of a standard N.T.S.C. television receiver. However, the complexity of the dividers and logic circuits of timing generator 126 may be simplified if each frame (field) is composed of 256 ($2^8$) horizontal scan lines. On the other hand, the use of only 256 horizontal scan lines per frame (field) makes the horizontal hold control adjustment range required of the standard television receiver more critical, but well within the range of conventional home TV sets.

By way of a first example, each character space may have an overall height of eleven horizontal scan lines, in addition to its overall width of seven dot intervals. Of this 7×11 character space, the character itself is situated in a 5×7 dot matrix portion thereof. The remainder of the character space provides space between adjacent characters in a row and space between adjacent rows. Timing generator 126 includes logic means for centering the display. In particular, as each horizontal scan line is equal in duration to the width of 54 character spaces, and each row of a display includes only 32 characters, the 32 characters are positioned centrally. Similarly, since 16 rows of characters occupy only 176 (16×11) horizontal scan lines, timing generator 126 includes logic circuits for employing only a predetermined 176 consecutive scan-line central portion of each frame for displaying characters.

As shown in FIG. 1, timing generator 126 providess a horizontal (H) and vertical (V) synch output; a readout control occurring at the dot rate; a readout control occurring at the character rate, and a line address. The H synch signals, which occur at the beginning of each horizontal scan line, and the V synch signals, which occur at the beginning of each successive frame (field), are applied as one input to mixer 128, which is discussed below. The dot rate readout control signals are applied as shift pulses to a shift register of parallel-to-serial converter 130, which is also discussed below. The character rate readout control is programmed to apply an input to the dynamic counter of PMAR 120 and shift pulses to page memory 122 and row memory 124, as described above, to result in a properly-timed scan of the 32 character spaces of each of the 16 rows of the display format of each frame (field). The line address consists of either a 3 or a 4 bit byte, depending upon requirements, for defining the then-being scanned one of either the first eight or the entire 11 scan lines comprising the height of each character space of each displayed row of characters. This line address is applied as an input to a read only memory (ROM) character generator 132, which also receives a 6 bit character code byte from the output of row memory 124. The readout control timing generator 126 is coordinated with the scanning of a frame (field) to cause page memory 122 to load the six shift registers of row memory 124 with the respective character code making up any displayed row of characters during one of the horizontal scan lines separating this row of characters and the preceding row of characters. Row memory 124 both recirculates and reads out to ROM generator 132 each character code, in turn, if the loaded row during each of the following seven scanning lines making up the 5×7 dot matrix portion of every character space in which each of the characters of that row is actually displayed. After this, the readout control opens up the recirculation loop of row memory 124 and page memory 122, loading row memory 124 with the character codes of the next row to be displayed, in the same manner as described above.

As is known in the art of raster scan video terminals, ROM character generator 132 normally has stored therein a 5×7 dot matrix for each of 64 characters. Besides including the alphabet and numerals, the 64 characters normally include various punctuation and other symbols of the type employed by teleprinters. Under the control of the 6 bit character code read out at the beginning of the scan of any given character space, the particular character to be read out in that character space is designated and in response to a 3 bit portion of the line address, the ordinal slice of that character to be produced during a given scan line through that character address is designated, as is known in the raster scan video terminal art. In response thereto, ROM character generator 132 reads out a 5 bit byte at the beginning of the scan through each successive character space. The respective bits of the 5 bit byte are applied in parallel to five consecutive stages of a seven stage shift register included within parallel-to-serial converter 130, thereby loading the shift register. In response to the each seven consecutive bit sequence of the dot rate readout control applied as shift pulses to this shift register, a 7-bit serial dot signal (corresponding to the 5 bit width of a character slice plus a two bit spacing between successive characters in a row) is read out of parallel-to-serial converter 130 as the video signal to be ultimately displayed by a standard television receiver. In particular, mixer 128 sums this video signal output from parallel-to-serial converter 130 with the H and V synch signals also applied as an input thereto to provide a composite output signal therefrom. This composite output signal from mixer 128 is applied as the modulating input to RF modulator 134, which modulates a carrier frequency of an unused VHF or UHG television band applied to RF modulator 134 from RF oscillator 136. Therefore, if the output from RF modulator 134 is applied to the antenna terminals of any standard television receiver, the standard television receiver will respond thereto by displaying the message stored in page memory 122 in a raster scan format which is synchronized by the H and V synch signals from timing generator 126, as is known in the art.

In the manner described above, the apparatus shown in FIG. 1 produces both an audio output from speaker 102 and a visual output from a standard television receiver in accordance with respective audio information and video information over which are originally recorded as audio frequency signals on a standard cassette magnetic tape and are supplied to the appartus of FIG. 1 from the "earphone" or "external speaker" jack of a standard cassette recorder or player.

Although the adapter of FIG. 1, as described above, is effective in eliminating most crosstalk between the time division multiplexed audio information and video information applied as an input to coupling means 100, it is not effective in eliminating crosstalk resulting from the presence of the aforementioned preamble code. In particular, the audio control present on connection 108 ensures that the input to coupling means 100 is forwarded to speaker 102 only so long as flip-flop 110 remains in its reset state. The setting of flip-flop 110 by the output of preamble detector 118 occurring at the beginning of a sequence of video-bit information disconnects the input to coupling means 100 from speaker 102, thereby preventing all video-bit information occurring subsequent to the occurrence of the preamble code from being forwarded to speaker 102 as unwanted crosstalk, which would otherwise be heard as a series of clicks. However, because it is necessary to receive the entire relatively long preamble code itself in order to set flip-flop 110, the frequency shift tone constituting the preamble code is still forwarded as unwanted crosstalk to speaker 102 in the operation of the adaptor shown in FIG. 1, as so far described.

Figure 2:
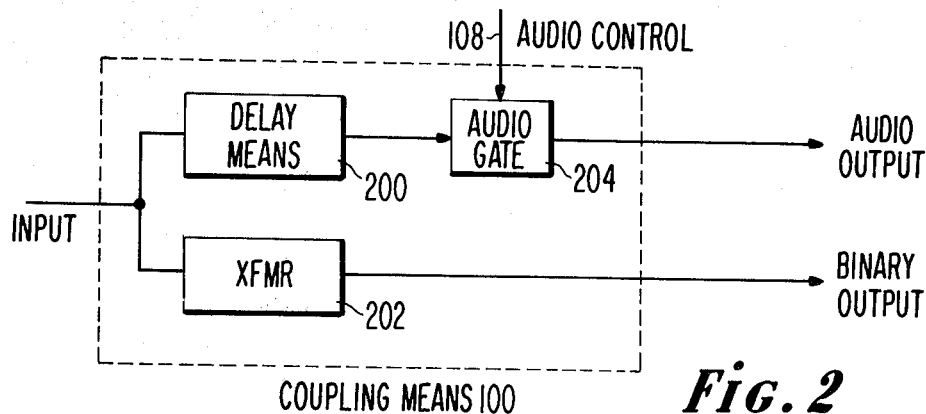
FIG. 2 is a block diagram of a preferred embodiment of the coupling means of FIG. 1, which eliminates any crosstalk between the video-information signals and the audio-information signals.

FIG. 2 shows a preferred embodiment of coupling means 100, which prevents unwanted crosstalk from being forwarded to speaker 102 in response to the occurrence of any preamble code. Specifically, the input to coupling means 100 from the jack of a standard cassette recorder or player is applied in parallel to the input of delay means 200 and the primary of transformer 202. The output from the secondary of transformer 202 is applied as the frequency-shift-keyed binary output of coupling means 10, which is applied as an input to FSK demodulator 106. Delay means 200 inserts a time delay between the input and output thereof which is substantially equal to the time duration of the relatively-long preamble code (between 132 and 176 milliseconds in the assumed example). The output from delay means 200 is applied as an input to normally-closed audio gate 204, which is controlled by the audio control signal on connection 108 from flip-flop 110, described above. The output from audio gate 204 is applied as the audio output from coupling means 100 and to audio amplifier 104. The time delay between the audio output from coupling means 100 and the input thereto permits sufficient time for preamble detector 118 to detect the preamble code and set flip-flop 110 so that audio gate 204 is closed prior to the occurrence of substantially any portion of the relatively-long frequency-shift tone forming the preamble code at the output of delay means 200. Thus, this frequency shift tone is never forwarded to speaker 102 and, hence, all crosstalk is substantially prevented by employing the preferred embodiment of FIG. 2 for coupling means

100.

Figure 3:
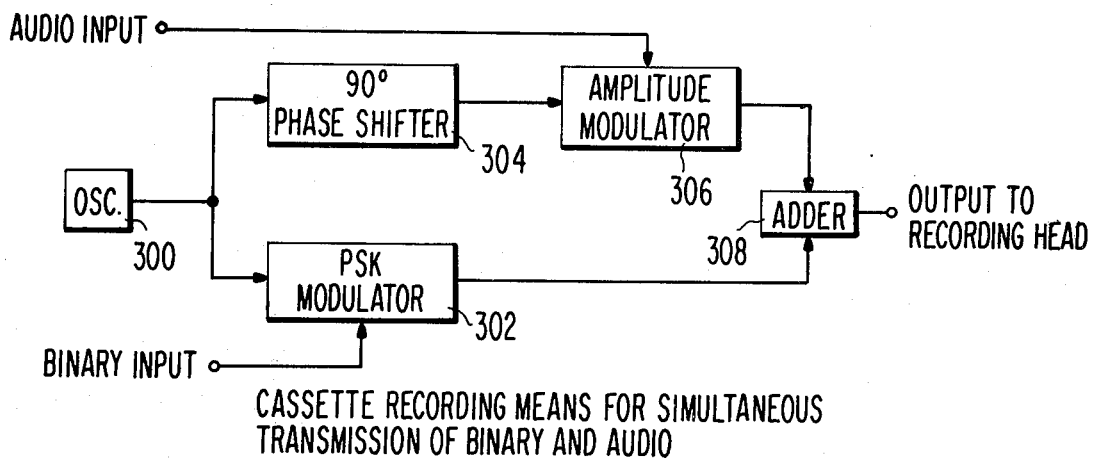
FIG. 3 is a block diagram of a cassette recording means for providing simultaneous, rather than time-division-multiplexed, transmission of video-information and audio-information signals.

In discussing both FIGS. 1 and 2, it has so far been assumed that the respective audio and video information recorded on the cassette tape has been recorded as separate, time-division multiplexed analog audio-frequency audio information and frequency-shift-keyed binary-coded video information signals. This need not necessarily be the case. FIG. 3 shows an alternative approach for recording a composite audio information and video information signal on a cassette tape which permits simultaneous transmission of both the binary video information signal and the audio information signal. Specifically, an audio tone from oscillator 300 is applied directly as a carrier frequency to phase-shift-keyed (PSK) modulator 302 and through 90° phase shifter 304 as a carrier to amplitude modulator 306. The video information is applied as a binary modulating input to PSK modulator 302 and the audio information is applied as an audio modulating input to amplitude modulator 306. In the absence of video information or in response to video information having a given binary value, such as ZERO, PSK modulator 302 produces an output at the carrier frequency having a given phase. The given phase may be chosen to be always in-phase with the phase of a carrier input of PSK modulator 302, or alternatively, it may be chosen to be always 180° out of phase with the carrier input to PSK modulator 302. In response to a video information signal of opposite binary value, such as binary ONE, PSK modulator 302 reverses the phase of the output signals therefrom (shifts the phase of the output signal by 180° with respect to the given phase thereof). The output from PSK modulator 302, manifesting the video information signal, is applied as a first input to adder 308 and the output from amplitude modulator 306, manifesting the audio information signal, is applied as a second input to adder 308. The composite signal appearing at the output of adder 308 is applied to the cassette tape to simultaneously record the audio and video information thereon. The effect of 90° phase shifter 304 is to make the audio information component of the recorded signal orthogonal with the video information component thereof. This orthogonality ensures that crosstalk therebetween is minimized.

In the case where the cassette recording means of FIG. 3 is employed for simultaneously recording both the video and audio information, rather than this information being recorded in time-division-multiplexed form as discussed in connection with FIG. 1, the adaptor of FIG. 1 is modified to employ a coupling means 100 the simultaneous binary and audio transmission coupling means 100 of FIG. 4. Furthermore, when coupling means 100 of FIG. 4 is employed, FSK demodulator 106, flip-flop 110, EOM detector 116 and preamble detector 118 are all dispensed with, and the binary output of FIG. 4 is applied directly as an input to serial-to-parallel converter 112.

Figure 4:
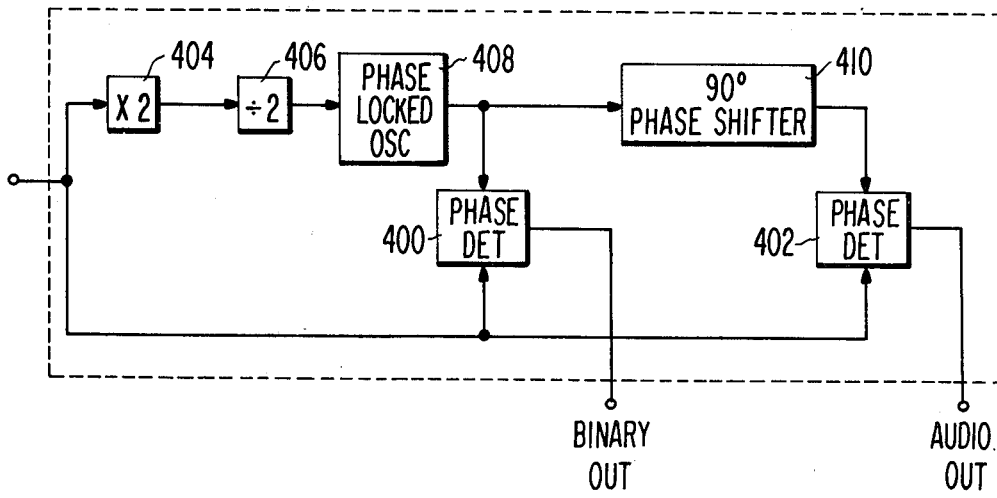
FIG. 4 is a block diagram of a modified embodiment of the coupling means of FIG. 1 required for simultaneous, rather than time division multiplexed, transmission of the video-information and the audio-information signals.

In the case of FIG. 4, the input obtained from the standard cassette recorder or player is applied both as respective signal inputs to first and second phase detectors 400 and 402 and as an input to frequency doubler 404. The output from frequency doubler 404 has a frequency double the modulated input frequency. Furthermore, any phase shift modulation component of the input frequency is eliminated, since double zero degrees is the same as double 180°. Therefore, when the output from frequency doubler 404 is divided by two by frequency halver 406, any continuous output frequency signal obtained has a frequency equal to that of the input, without any phase-shift modulation component. This signal is employed to lock the phase of phase-locked oscillator 408. Since, as discussed in connection with FIG. 3, the phase of the output from PSK modulator 302 and the absence of any video information is assumed to be the same as the phase of the output from PSK modulator 302 in the presence of video information manifesting a binary ZERO, the reference phase manifested by the frequency output from phase-lock oscillator 408 may be considered to correspond with that of a binary ZERO. The use of phase-locked oscillator 408 provides a reference signal which is applied directly as a second input to phase detector 400 and is applied through 90° phase shifter 410 as a second input to phase detector 402. The use of a phase-locked oscillator, which is phase-locked by a signal derived directly from the playback of the standard cassette recorder, makes the phase of the reference signal appearing at the output of phase-locked oscillator 408 independent of fluctuations of the actual tape velocity during playback from the nominal value thereof. This permits the relatively poor tape transports and the relatively poorly regulated power supplied found in many standard cassette recorders or players to be accommodated. Phase detector 400 provides synchronous detection of the in-phase component of the input signal and phase detector 402 provides synchronous detection of the quadrature component of the input signal. The output from phase detector 400 which manifests the binary video information component of the input signal has a first relative polarity in response to a binary ZERO and a second polarity opposite the first polarity in response to a binary ONE. The output from phase detector 402 is the demodulated audio information analog signal. As discussed above, the binary output from FIG. 4 is applied at an input to serial-to-parallel converter 112 and the audio output thereof is applied as an input to audio amplifier 104.

Figure 5A:
FIGS. 5a and 5b illustrate the video-signal response characteristics and the contrast variations effects thereof on the visual display of a television receiver exhibiting limited bandwidth.
Figure 5B:
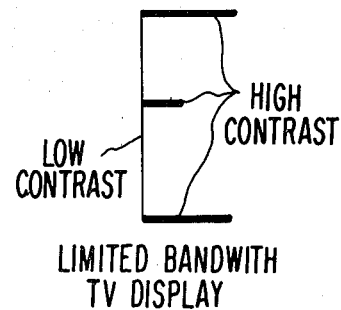

Raster scan video terminals, known in the art, usually incorporate a television monitor as the display unit. Such television monitors provide a video bandwidth sufficiently wide to pass all the frequency components found in a video signal, but are relatively expensive compared to the cost of an average standard black and white TV receiver. However, the video bandwidth of a standard TV receiver is usually limited with respect to the frequency components found in the video signals. The effect of this is to provide a relatively poor response to the high frequency components of the video signal with respect to the response to the low and middle frequency components thereof. For instance, consider the video signal response, shown in FIG. 5a, to the horizontal and vertical components of a displayable character, such as the letter "E," shown in FIG. 5b, due to the limited video bandwidth of a standard television receiver. The top and bottom horizontal line of a displayed letter "E" may each consist of five consecutive dot intervals of a horizontal scan line, while the middle horizontal line of a displayed letter "E" may consist of three, or even four, consecutive dot intervals of a horizontal scan line. However, the vertical portion of a displayed letter "E" is made up of a plurality of vertically arranged single dot intervals, with each of these single dot intervals occurring during a separate horizontal scan line. As shown in FIG. 5a, due to the limited high frequency response of the standard television receiver, the slope of the leading edge of the video signal is sufficiently low to require more than a single dot interval to rise to its maximum value. This causes the amplitude of a vertical-line single dot interval to be significantly attenuated with respect to the amplitude of a horizontal-line manifesting plural dot interval video signal component. The result of this, as shown in FIG. 5b, is that the horizontal line components of a displayed character appear with a much higher contrast than does the vertical line component thereof.

Figure 6A:
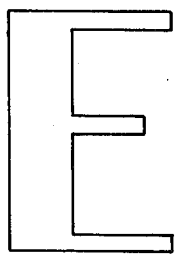
FIGS. 6a and 6b illustrates respectively a correction font and a video-signal correction circuit for limited bandwidth television displays.
Figure 6B:
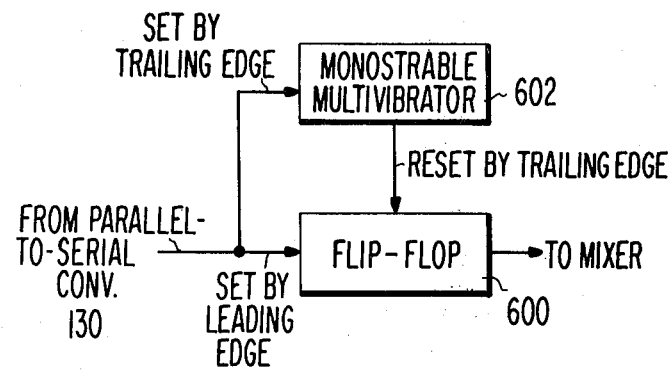

First and second different remedies to this problem are shown in FIG. 6a and 6b, respectively. As shown in FIG. 6a, one solution to this problem is to modify the dot-matrix font for the characters stored in ROM character generator 132. In particular, the vertical-line portion of a letter to be displayed, such as the letter "E," may be made of a plural number of consecutive dot intervals, such as two, per horizontal scan line, to thereby compensate for the limited high frequency response of the video bandwidth of a standard television receiver. Although the correction font for limited bandwidth TV display, shown in FIG. 6a does provide a solution to the contrast problem shown in FIG. 5b, it lacks flexibility. Therefore, an electronic approach to a solution to this problem, such as shown in FIG. 6b, is somewhat superior to this solution shown in FIG. 6a. Essentially, the video-signal correction approach is to electronically add an incremental interval to all videosignal components. Although the duration of this incremental interval is preferably made adjustable under the control of the television viewer, at any given setting of the adjustment it is the same durations for both vertical-line manifesting, single-dot interval and horizontal-line manifesting, multiple dot-interval components of a video signal corresponding to a character to be displayed. Therefore, the video signal correction circuit shown in FIG. 6b is intended only to be representative of one simple way this function can be accomplished, and not to be limiting, since the same function could be accomplished by various other relatively simple circuits whose design would be obvious to any one skilled in the art.

The video-signal correction circuit, shown in FIG. 6b, is inserted in the connection between the output of parallel-to-serial converter 130, at which the video signal appears, and the video input to mixer 128, as shown in FIG. 1. Specifically, the output from parallel-to-serial converter 130 is applied as both an input to flip-flop 600 and a set input to monostable multivibrator 602. Flip-flop 600 is designed to be set by the leading edge of any dot-interval component video signal applied thereto, while monostable multivibrator 602 is designed to be set only by the occurrence of the trailing edge of this dot-interval component of the video signal. The output from monostable multivibrator 602 is applied as a reset input to flip-flop 600 and flip-flop 600 is designed to be reset only by the trailing edge of the output from monostable multivibrator 602. Flip-flop 600 produces an output which exists over the entire duration from the setting thereof until the resetting thereof. This output from flip-flop 600 is applied as the video input to mixer 128.

In operation, the video-signal correction circuit shown in FIG. 6b produces a corrected video signal component which begins in coincidence with the beginning of the uncorrected video component applied thereto from parallel-to-serial converter 130, but which corrected video component endures for a given incremental interval, determined by the delay provided by monostable multivibrator 602, beyond the end of the uncorrected video component applied as an input thereto from parallel-to-serial converter 130. By making the delay provided by monostable multivibrator 602 adjustably settable under the control of the television viewer, the amount of correction may be adjusted to provide substantially equal contrast between vertical and horizontal line components of a displayed character for that particular television receiver. In this manner, the variation in the limitation in video bandwidth from television receiver to television receiver can be accommodated.

Although for most purposes it is essential that the display provided by the video information include alpha-numeric characters, is also desirable that the display have a graphic capability. One obvious way of obtaining a relatively simple graphic capability, without in any way increasing the complexity of the adaptor, is to employ the character code manifesting a period (.) as the element of a graphic pattern, rather than as a punctuation mark. In this manner, a graph or other dot-pattern can be displayed by selectively writing character-codes manifesting a period into any desired predetermined ones of the 512 character spaces within page memory 122 of FIG. 1. However, since a period occupies a specific predetermined single dot position within the 5×7 dot matrix within ROM character generator 132, only this predetermined dot position within any character space is available for use in producing graphic displays. This severely limits the geometric arrangement of the dots in a displayed graphic pattern, since all the available dots which can be used to produce a graphic display must be selected from 512 dots arranged in 16 linear rows and 32 linear columns.

Figure 7:
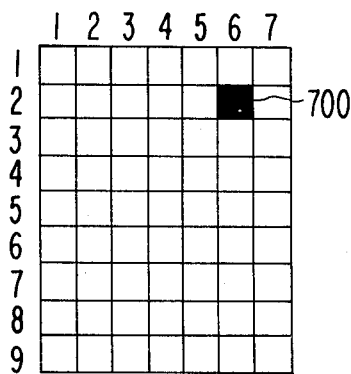
FIG. 7 illustrates a 7X9 dot matrix character space for displaying any single selected dot position therein to provide improved graphic displays.

Although it is not possible to increase the maximum number of available dots for a graphic pattern from 512 without increasing the size of the page memory (which would appreciably increase the cost of the adaptor), it is possible, by a slight modification requiring only a relatively inexpensive additional ROM chip, to increase the flexibility in the geometric arrangement with which any graphic containing up to 512 dots may be displayed. By way of example, assume that the logic circuit of timing generator 126 provide character spaces comprising a total of 63 dot intervals arranged in a 7×9 distribution (rather than the 7×11 distribution assumed earlier in the discussion of FIG. 1). Referring to FIG. 7, it would be desirable to be able to situate a single dot 700 in any one of the available 63 separate dot positions within the 7×9 character space dot position matrix 702, rather than limit dot 700 to a fixed, predetermined dot position, such as dot position (6, 2) occupied by dot 700 in FIG. 7.

Figure 8:
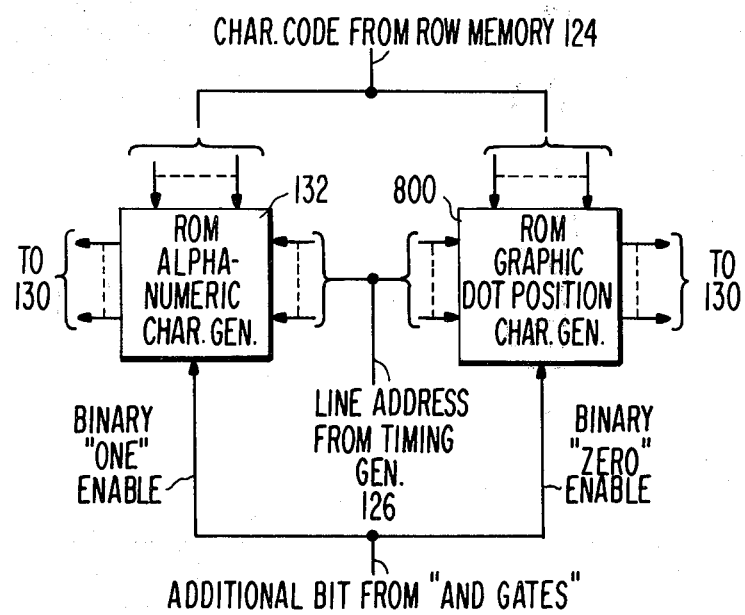
FIG. 8 illustrates a modification of the adaptor of FIG. 1 for implementing the selectable single dot position within each character space, as shown in FIG. 7, to provide improved graphic displays.

As discussed earlier in connection with FIG. 1, a chaaracter code is composed of 6 bits, which provides a total of 64 different available binary codes. Conventional ROMR character generator shifts, such as those used in raster scan video terminals, are capable of storing 64 individually-addressable different characters. As shown in FIG. 8, a second, 64 address, read-only memory 800, may be used for selecting any one of the 63 dot positions of matrix 702. ROM 800 is connected in parallel with conventional ROM alpha-numeric character generator 132. Either of character generators 132 or 800 may be selected by adding an additional control bit to each byte. Thus, in the case of the modification of FIG. 1 shown in FIG. 8, each byte consists of 8 bits, rather than 7 bits, with each of the 8-bit bytes including two control bits. By way of example, if this additional bit has the binary value "ONE", alpha-numeric character generator 132 is selected and the apparatus operates in the manner previously described to provide an alpha-numeric display. However, if this additional bit manifests a binary "ZERO," graphic dot position character generator 800 is enabled and, in this case, each of a group of 63 out of the 64 individual character codes that can be applied to the character generator during the display of any character space defines the individual dot position within the 7×9 matrix 702 at which that dot 700 is to be displayed. The appropriate single one of the stages of the shift register of parallel-to-serial converter 130 is only loaded when the line address to ROM 800 from timing generator 126 indicates that the appropriate one of the horizontal scan lines is then being scanned. Thus, assuming that graphic dot position character generator 800 is enabled, if the character code from row memory 124 manifests the dot position of dot 700 within matrix 702 of FIG. 7, graphic dot position character generator 800 produces no output at all when the line address from timing generator 126 indicates that any of the first, third, fourth, fifth, sixth, seventh, eight, or ninth horizontal scan lines of the character space is being scanned. However, when the line address indicates that the second line is being scanned, ROM 800 will load the sixth stage of the shift register of parallel-to-serial converter 130. This results in the display of dot 700 in the dot position indicated in FIG. 7 in that particular character position. In a similar manner, the dot position, if any, occupied by graphic pattern dots in any of the other 511 character positions is selected. This greatly enhances the versatility with which graphic patterns may be displayed, without in any appreciable way increasing the cost or complexity of the adaptor.

Although for the purposes of illustrating the invention, many specific numerical values have been assumed, it should be understood that these specific numerical values are not intended to in any way limit the scope of the disclosed invention. For instance each byte might include two additional bits for controlling the displayed color of a character on a color television receiver.

What is claimed is:

1. A recording medium having recorded thereon one or more time-division-multiplexed sequences of analog audio-information and sequences of binary-coded video information composed of first and second frequency-shift-keyed audio tones, any sequence of video information recorded on said medium being immediately preceded by a preamble code comprising a given length of a single one of the frequency-shift-keying audio tones, said given length being significantly longer than the interval of any signal component of said audio information whereby upon playback of said medium a sequence of video-information may be reliably distinguished from a preceding sequence of audio information.

2. The recording medium defined in claim 1, wherein each of said video-information binary codes consists of a first given number of consecutive binary bits that have binary values selectively determined by that particular code and said preamble code consists of a second given number of consecutive binary bits that all have the same predetermined binary value, said second given number being significantly larger than said first given number, whereby said given length of said preamble code is significantly longer than the length of any of said video-information binary codes.

3. An adaptor for inter-relating an external audio input device with a standard television receiver, wherein said device plays back one or more time-division-multiplexed sequences of analog audio-information and sequences of binary coded video information composed of first and second frequency-shift-keyed audio tones for deriving a serial signal which is applied as the signal input to said adaptor, and wherein any sequence of video information recorded on said tape is immediately preceded by a preamble code comprising a given length of a single one of the frequency-shift-keying audio tones, said given length being significantly longer than the interval of any signal component of said audio information; said adaptor comprising:
   a video-information channel initially decoupled from said signal input to said adaptor,
   first means including a preamble code detector for continuously monitoring said signal input applied to said adaptor, and
   second means coupled to said first means and said video-information channel for coupling said video-information channel to said signal input in response to the detection of said preamble code by said preamble detector.

4. The adaptor defined in claim 3, wherein each of said video-information binary codes consists of a first given number of consecutive binary bits that have binary values selectively determined by that particular code and said preamble code consists of a second given number of consecutive binary bits that all have the same predetermined binary value, said second given number being significantly larger than said first given number, and wherein said preamble detector includes means for producing a preamble detection output only in response to the receipt thereby of said second given number of consecutive binary bits all having said predetermined binary value.

5. The adaptor defined in claim 4, wherein said adaptor includes an end-of-message detector responsive to a preselected one of said video information binary codes which always occurs as the last code in any sequence of video information, and third means for applying the output from said end-of-message detector to said second means for decoupling said video-information channel from said input signal in response to the detection of said preselected one of said video-information binary codes by said end-of-message detector.

6. The adaptor defined in claim 5, wherein said adaptor includes an audio information channel coupled to said second means to couple said audio-information channel to said signal input only when said video-information channel is decoupled therefrom and to decouple said audio-information channel from said signal input only when said video-information channel is coupled thereto.

\* \* \* \* \*